United States Patent [19]
Fielding et al.

[11] Patent Number: 5,841,765
[45] Date of Patent: Nov. 24, 1998

[54] DEMAND-BASED CONNECTION MANAGEMENT INTEGRATED SERVICES ACCESS TERMINAL (ISAT) FOR SATELLITE COMMUNICATION SYSTEM

[75] Inventors: Dennis E. Fielding, Indialantic; Todd W. Gross, Palm Bay; John P. Arnold, Melbourne, all of Fla.

[73] Assignee: Skydata, Inc., West Melbourne, Fla.

[21] Appl. No.: 728,636

[22] Filed: Oct. 10, 1996

[51] Int. Cl.$^6$ .................................................. H04B 7/208
[52] U.S. Cl. .......................... 370/319; 370/341; 370/353
[58] Field of Search ................................... 370/321, 329, 370/436, 330, 344, 343, 341, 316, 319, 480, 400, 351, 356, 254, 255, 496, 353, 352; 458/12.1, 450, 509, 510; 375/222

[56] References Cited

U.S. PATENT DOCUMENTS

| | | | |
|---|---|---|---|
| 4,868,811 | 9/1989 | Suzuki ...................................... | 370/436 |
| 5,274,837 | 12/1993 | Childress et al. ........................ | 455/510 |
| 5,434,850 | 7/1995 | Fielding et al. ......................... | 370/321 |
| 5,530,916 | 6/1996 | Schultz .................................... | 455/509 |
| 5,572,530 | 11/1996 | Chitre et al. ............................. | 370/316 |

*Primary Examiner*—Chau Nguyen
*Attorney, Agent, or Firm*—Charles E. Wands

[57] ABSTRACT

A demand-based connection management satellite communication network includes a plurality of geographically distributed earth stations, each earth station having a frame relay protocol-based switch for interfacing message signals between terminal devices and modem unit. One of the earth stations is a hub station whose modem unit includes plural demodulators tuned to carrier frequencies transmitted from other, remote stations. Each remote station has at least one hub-programmable demodulator and/or a programmable modulator. When an originating station receives a request from a terminal device for connectivity with a terminal device at a destination station, it transmits a connectivity request message to the hub station. In response, the hub station checks a demodulator and/or modulator frequency assignment database for demodulator availability. If each originating and destination station has an available demodulator and modulator pair, the hub transmits tuning messages to the two stations, which tune their programmable modem components to each other's carrier frequency, and thereby provide bidirectional connectivity between the two remote stations.

68 Claims, 5 Drawing Sheets

DEMAND-BASED CONNECTION MANAGEMENT INTEGRATED SERVICES ACCESS TERMINAL (ISAT) FOR SATELLITE COMMUNICATION SYSTEM

FIELD OF THE INVENTION

The present invention relates in general to satellite communication systems, and is particularly directed to a demand-based connection management satellite communication network, employing a frame relay protocol-based integrated services access terminal interface, which is operative under hub station control to provide bidirectional signaling capability among a plurality of (diverse bandwidth) end terminal devices, including multiple audio (voice) circuits, that may be coupled to various stations of the network.

BACKGROUND OF THE INVENTION

The increasing availability of reasonably priced satellite communication services, and a variety of narrow bandwidth (voice/data) and wide bandwidth (video) devices to meet the needs of a broad spectrum of communication system users has led to communication system architectures that can be tailored in terms of connectivity structure and customer utilization. This diversity of equipment types and signal processing capability has resulted in the desirability of having 'local' area networks (LANs), customarily limited to terrestrial-based systems of a limited geographical area, be expanded to encompass a much larger scale of communication services, preferably those employing satellite link transmission equipment to connect terminal devices among well dispersed office sites.

Figure 1:
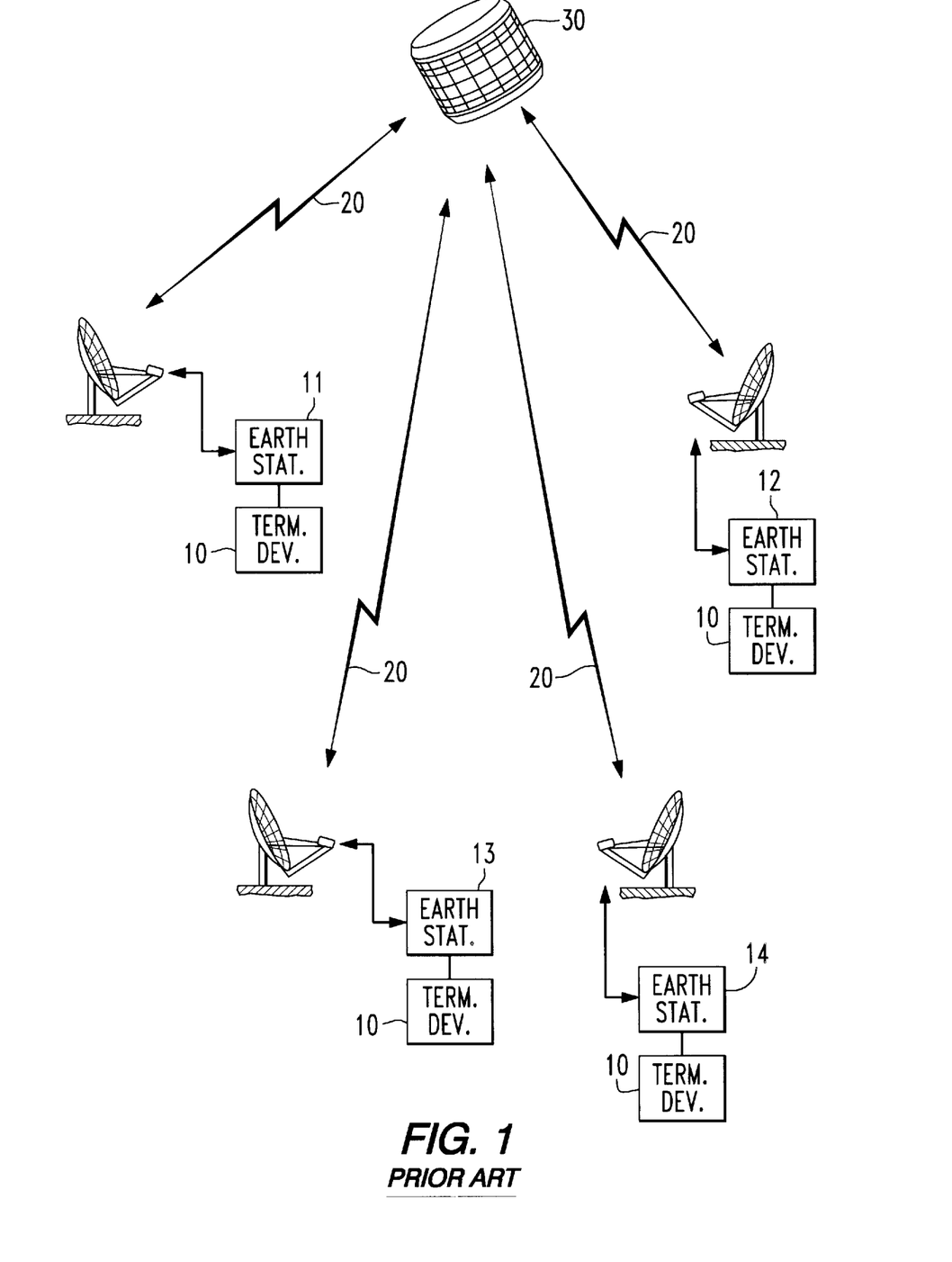
FIG. 1 diagrammatically illustrates a satellite-based communication network, where any terminal device in the network has a direct satellite link to any other terminal device in the network.

To facilitate inter-office communications, it is preferred to have such satellite-based systems configured as mesh networks. A simplified example of such a network is shown diagrammatically in FIG. 1 as being comprised of four earth stations 11, 12, 13, 14. In such a network, for interstation connectivity, each terminal device 10 has a direct satellite link 20 (via one hop through a relay satellite 30) to any other terminal device 10 in the network. Connectivity between a respective terminal device 10 that is ported to an associated earth station interface and a respective terminal device 10 that is ported to another earth station interface may be effected by providing each earth station with a multiplexing, demultiplexing subsystem, that is operative to controllably uplink messages from any terminal device (e.g. audio (voice), data, video equipment) over an outbound link and to distribute downlink messages to their intended destination terminal devices.

One type of multiplexing scheme involves a time division multiplexing (TDM) and demultiplexing arrangement, through which a fixed number of bytes for each user port are allocated within a fixed information frame. The frame size (total number of bytes) may be determined by the number of ports and their data rates, and the number of frames transmitted per second. The number of TDM frames per second determines the aggregate data rate. The aggregate data rate includes the total user port data rate plus framing overhead.

Interfacing respective terminal devices with the TDM subsystem may be effected by means of a dedicated multiport switch associated with the respective multiplexer and demultiplexer units of the earth station, with each multiport switch being configured for an equal number of data communication equipment (DCE) and data terminal equipment (DTE) ports, so as to provide full matrix capability between DCE and DTE ports. The port speed and format (DCE to DTE) must match; however, matrix switches can usually translate between different physical and electrical characteristics.

A problem associated with such a TDM-matrix switch earth station architecture proposal is the fact that its terminal-to-terminal connectivity involves dedicated port connections, which remain fixed unless the system is physically reconfigured. As a result, in a such a system, only a very limited selectivity for voice calls is afforded, since only point-to-point connections can be effected between voice multiplexers and not among the voice circuits themselves that connect to the voice multiplexers. In addition, TDM schemes are very sensitive to timing and network synchronization, since no queuing is performed. A master network timing source is required for all network subsystems. Also, because suppliers of multiplexer and matrix switch components are not the same, different monitor and control mechanisms are necessary for each respective piece of equipment. This need is further burdened by the fact that, due to the unique character of a simplex data stream, the required multiplexer/demultiplexer is not an off-the-shelf product. Finally, the cost of such a system is not insignificant, as each of the multiport switch and the multiplexer and demultiplexer components must be purchased separately.

To solve this problem, we have developed a satellite communication network, which employs an earth station architecture having a frame relay protocol-based multiplex switching mechanism to control the uplink and downlink routing of messages among the terminals in the network. This frame relay protocol-based earth station architecture is described in the U.S. Pat. No. 5,434,850, by D. Fielding et al, entitled: "FRAME RELAY PROTOCOL-BASED MULTIPLEX SWITCHING SCHEME FOR SATELLITE MESH NETWORK," issued Jul. 18, 1995, assigned to the assignee of the present application and the disclosure of which is incorporated herein.

In accordance with the above-referenced patented invention, a network interface 'frame relay' standard defines the multiplexing of multiple virtual ports across individual physical communication port. The interface standard 'frame relay' is based upon the transmission and reception of individual frames or packets of information serially through a port, with a respective frame of digital data containing additional address and control bytes for routing and elementary error detection and flow control.

The frame relay switch is ported via a first set of terminal ports to a plurality of 'local' terminal devices, which may include respective voice, data and video signaling equipments. A voice signal link transports low bit rate digitized voice signals (e.g., those having an encoding rate of less than 10 kb/s), to and from a voice signal multiplexer, in order to interface voice traffic with a plurality of voice signaling circuits that are selectively accessible through the multiplexer. The voice signaling link also conveys call supervision signals, including dial tone detection, dialing, circuit busy, call connect and call termination control and status signals. The voice signal multiplexer is operative to append and decode terminal device selectivity information to the address field portion of a frame processed by the frame relay switch. Also ported to the frame relay switch are one or more data links that may be coupled to two-way synchronous data terminal devices. An additional port of the frame relay switch may be coupled to a link for wide bandwidth signals, such as a video teleconferencing terminal.

On its satellite link side, the frame relay switch is coupled via a modem unit to an attendant RF transceiver unit having an associated satellite antenna unit for transmitting uplink channel signals to the relay satellite and receiving downlink channel signals from the satellite. The modem unit contains a single uplink modulator having a fixed transmission frequency associated with that earth station, and a plurality of downlink demodulators, which are respectively tuned to the transmission frequencies employed by each of the other stations of the network, thereby providing connectivity among the multiple earth stations of the network.

Using address and control fields employed by frame relay connectivity control software, the frame relay switch is dynamically configurable to provide multilayer addressing and device selectivity (filtering), thereby enabling point-to-point connectivity of multiple terminal devices, such as a plurality of voice circuits served by the voice circuit multiplexer unit to which a voice signal port of the frame relay switch is coupled. Dial codes on the trunk or station side of the voice signal link are translated into frame relay addresses (data link connection identifiers) that are added to each frame of data for routing through the network. With this additional layer of routing information, voice connectivity is available between any two voice terminal devices (e.g. trunks) in the network.

Now although the frame relay switch-based earth station architecture described in the above-referenced patent is a very effective scheme for providing connectivity among a reasonably small number of earth stations (e.g., eight to ten or less as a non-limiting example), which are generally fully utilized for terminal-to-terminal communications, simply providing a linear expansion of the system for the purpose of serving the needs of a less than majority of the time or occasional user is not a cost effective application of system resources. On the other hand, the less than full time user cannot be ignored. The problem is how to offer the communication functionality of a frame relay switch-based earth station to a reduced usage customer in a cost effective manner.

SUMMARY OF THE INVENTION

In accordance with the present invention, this problem is solved by incorporating a master or hub station into the above-referenced network, so as to convert the network to a star-mesh connectivity configuration, and modifying the demodulator and/or modulator composition of the modem unit of each non-hub or remote earth station to provide hub station-tuned connectivity with any other remote station.

Pursuant to a first aspect of the present invention, a respective remote station's modem is modified to include a first 'hub-tuned' demodulator that is tuned to and dedicated for hub-sourced control messages, and at least one second, programmable demodulator that is controllably tunable by the hub station to the transmission frequency of the modulator of another remote station. When a call is initially placed from a customer's terminal device, the customer dials an access code. The supervisory microcontroller associated with each remote station's frame relay switch stores table entries indicating whether there currently exists an active link to the called or destination station.

In response to the access code, these originating station's control processor are examine these table entries to determine whether a link has already been established between the originating station and the destination station. If there is no existing link, the originating station's control processor generates a 'link request' packet, for transmission to the hub station, the link request packet designating which remote station is the destination station, and being repeatedly transmitted over the network to the hub station at a predetermined repetition rate for a prescribed number of repeat tries. (If a link has already been established between the originating and destination stations, the originating station's control processor does not generate a 'link request' packet. Instead, a 'call routing' packet is forwarded to an idle voice circuit, and the voice circuit seizes a line.)

In addition to transmitting a link request packet, the originating or calling remote station also transmits a 'call request' packet over the network, for delivery to the destination or called station. This 'call request' is repeatedly transmitted a predetermined number of times, or until the hub station establishes a connectivity path through the network between the originating and destination stations, and the call is received and processed by the destination station.

In the course of establishing a connectivity path through the network between the originating and destination stations, a master supervisory or network management facility (NMF) computer within the hub station examines a network configuration database, to determine whether a tunable demodulator in each of the originating and destination remote stations is available. If either or both of the originating and destination stations contains no currently available tunable demodulator (in use with other stations in the network), the voice circuit in the originating station will time out, causing a busy signal to be returned to the calling party's telephone.

However, if a tunable demodulator is available in each of the originating and remote stations, the hub station's NMF computer causes a demodulator-programming message to be transmitted to each of the originating and destination stations. In response to a demodulator programming message, the control processor of each of the originating and destination stations supplies a demodulator control code to a frequency-programmable demodulator within that station, thereby tuning the demodulator to the transmission frequency of the other remote station's modulator, and establishing a communication connectivity link between the originating and destination stations.

Once a link has been established between the originating and destination stations, the call request packet downlinked to the destination station will be coupled through its frame relay switch to the destination station's control processor. The destination station's control processor then forwards a 'call routing' packet to an idle voice circuit, and the voice circuit seizes a line, to complete a communication path between the calling terminal device at the originating station and the called terminal device at the destination station. In addition to forwarding the call request packet to an idle voice circuit, the destination station's control processor also causes a 'call accepted' packet, containing information representative of the completed path, to be returned to the originating station.

The hub-programmed demodulators in each of the originating and destination stations will continue to be tuned to their assigned frequencies as long as any voice calls are present. As a result, even if the call that initiated the call establishment sequence described above is terminated, if there is another call between the two stations on the established link, neither demodulator can be tuned to another station.

When there is no longer any traffic between the originating and destination stations, the control processor in the originating station forwards a message to the hub station, indicating that all traffic between the linked stations has been completed. The hub station's NMF computer then updates the network configuration database, to allow the tunable demodulators in the originating and destination stations to be allocated for other links as required.

Pursuant to a second aspect of the invention, where the traffic characteristics of the remote station are relatively infrequent and active for a only short period of transmission time, rather than have the remote station's modulator dedicated to a given outbound carrier, neither an outbound nor an inbound carrier is initially assigned. Instead, each remote station has both a tunable modulator and a tunable demodulator, plus a separate hub-sourced control carrier demodulator. In response to a remote station's request for service on the control carrier, the hub station tunes respective modulator and demodulator components at each of the calling and called remote stations to carrier frequency pairs that have been selected from a pool or table of available carrier frequencies, so that the calling and called stations may communicate with one another. If allocatable resources, Modulator, demodulator or carrier frequencies, are not available to process the request for service, the hub station NMF will inform the originating station.

DETAILED DESCRIPTION

Before describing in detail the new and improved demand-based connection management ISAT earth station architecture in accordance with the present invention, it should be observed that the invention resides primarily in what is effectively a prescribed arrangement of conventional communication circuits and associated signal processing components. Consequently, the configuration of such circuits components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

Figure 2:
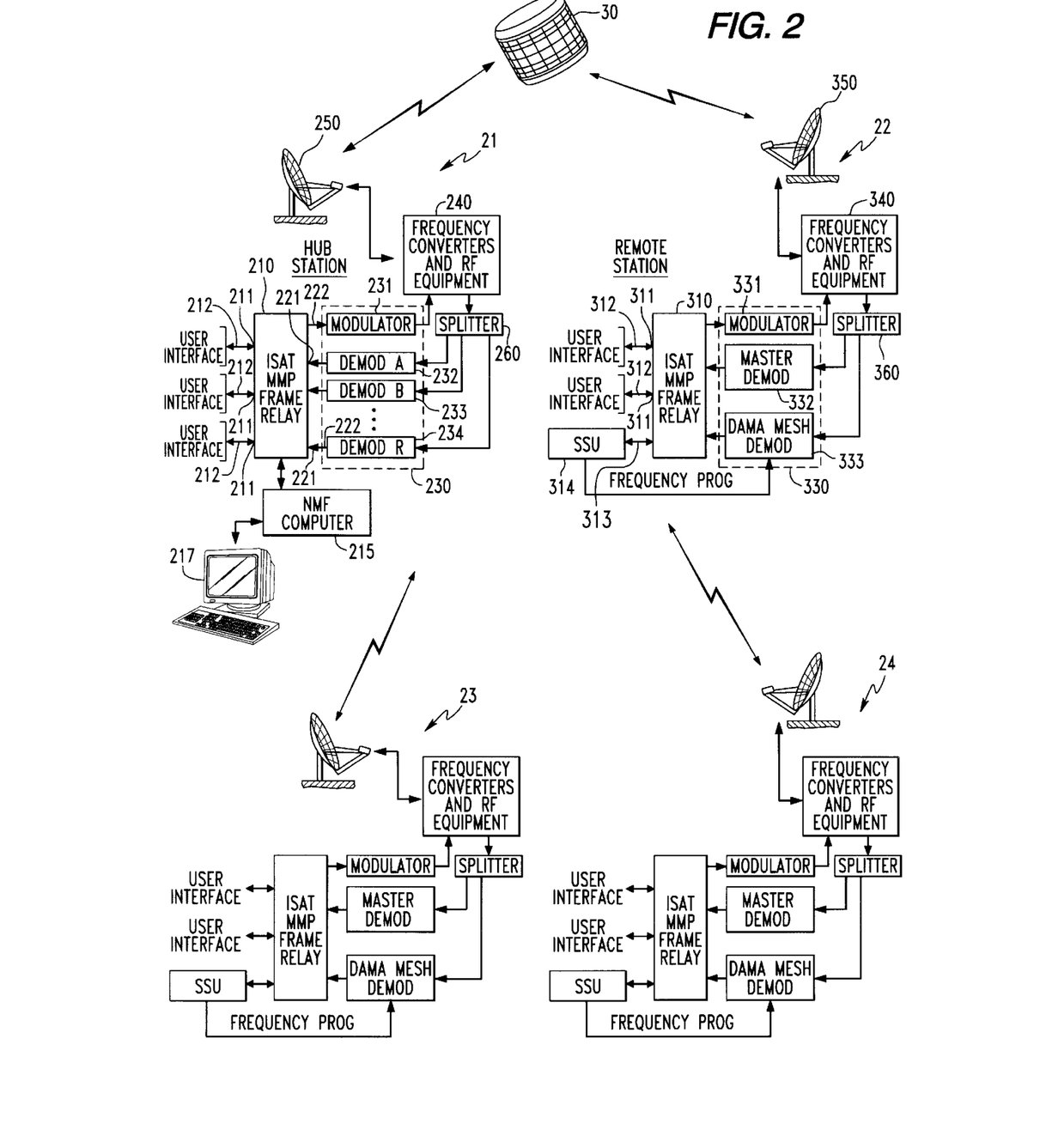
FIG. 2 diagrammatically illustrates a reduced complexity demand-based connection management satellite communication network having a hub station and a plurality of remote stations, wherein each remote station has a dedicated outbound carrier modulator and a programmable demodulator.

Referring now to FIG. 2, a reduced complexity demand-based connection management satellite communication network in accordance with a first aspect of the present invention is diagrammatically illustrated as having a master or 'hub' station 21 and a plurality of 'remote' stations 22, 23 and 24, each of which employs a frame relay protocol-based integrated services access terminal interface or frame relay switch, of the type described in the above-referenced patent. In the hub station 21, a frame relay protocol-based integrated services access terminal interface (or simply frame relay switch) 210 is operative to provide bidirectional signal transport connectivity between signal transport links that are coupled to a plurality of terminal devices and modulator and demodulator components associated with satellite communication RF transceiver circuitry.

For this purpose, the frame relay protocol-based integrated services access terminal interface 210 may comprise a commercially available frame relay switch unit, such as a model 9800, microcontroller-driven, frame relay switch, manufactured by Teleglobe (Memotec) Inc.,-Montreal, Canada. The connectivity through frame relay switch 210 is controlled by an associated microcontroller, which is supervised by a network management facility (NMF) computer 215 and an associated hub terminal interface 217. As will be described, the hub station's NMF computer 215 maintains a network connectivity database that includes a list of transmission frequencies and bit rates currently assigned to the various remote stations of the network and an indication of the availability of a tunable demodulator and modulator in each remote station.

As detailed in the above patent, the frame relay switch's microcontroller employs a network interface frame relay standard (e.g. ANSI, CCITT), to define the multiplexing of multiple virtual ports across a single physical communications port of the frame relay switch. The interface standard 'frame relay' is based upon the transmission and reception of individual frames (or packets) of information serially through a port. In accordance with this standard, a respective frame of digital data contains address and control bytes that are employed for routing and elementary error detection and flow control.

The customer side of the frame relay switch 210 has a first plurality of terminal ports 211, that are coupled via respective terminal device links 212, to various 'local' user interface equipments. Such links may include (but are not necessarily limited to) links of the type described in the above-referenced patent, such as voice signal links, a plurality of data links, and a video link.

When employed to transport voice signals, a respective link 212 may transport low bit rate digitized voice signals, such as those having an encoding rate of less than 10 kb/s, with echo cancellation and minimal queuing delay, by way of a voice signal multiplexer (not shown), which is coupled in turn to a plurality of voice signaling circuits. Those ports of the voice signal multiplexer which provide connectivity between one of a plurality of voice signaling circuits and the voice signal link may be considered to be virtual ports of the frame relay switch 210, since such a voice signal-transporting link 212 is physically connected to the terminal devices through the voice signal multiplexer, rather than directly to the terminal devices.

In a transmission path from a customer's user interface, the voice signal multiplexer is operative to selectively couple voice signals sourced from a respective voice circuit terminal device, such as a trunk circuit to the voice signal link. In the course of multiplexing such a selected voice circuit to the voice signal link, the voice signal multiplexer provides data link connection identifier information (the virtual port address) as part of the address field of the call message signals being supplied to the frame relay switch 210. The destination address field also contains a terminal device (e.g. called party number) code, employed by a voice circuit multiplexer served by a destination station to control demultiplexing voice signals to a called user interface.

Similarly, in the course of demultiplexing an incoming call downlinked through the frame relay switch 210 via one of the terminal device links 212, the voice signal multiplexer decodes the data link connection identifier information as part of the address field of the call message signals being supplied from the frame relay switch, so that the call may be properly routed to the intended user interface (terminal device). Links 212 also transport conventional call supervision signals, including dial tone detection, dialing, circuit busy, call connect and call termination control and status signals.

Additional ones of the terminal device links 212 may be coupled to and provide data rate signaling for two-way synchronous data terminal devices. A further one of links 212 may be employed for transporting video signals to a video teleconferencing terminal. The teleconferencing video and associated voice signals may be digitized and compressed into a single data stream (e.g., at aggregate data rates on the order of from 112 to 384 kb/s, as a non-limiting example). Since a wider bandwidth is required for video teleconferencing capability, that one of the terminal ports 211 of the frame relay switch 210 employed for video communication may be used on only an occasional basis, and may require one or more other signaling channels to be turned off during a teleconference.

On its satellite link or transceiver-modem side, the frame relay switch 210 has a second plurality of terminal ports 221, that are coupled via links 222 to modulator and demodulator circuits contained within a modulator/ demodulator (MODEM) unit 230. To provide star connectivity with the (three) remote earth stations 22, 23 and 24 of the reduced complexity network of FIG. 2, the hub station's MODEM unit 230 includes a single uplink modulator 231, and a plurality (three in the present example) of downlink demodulators 232, 233 and 234. As described in the above-referenced patent, the respective modulator and demodulator components within MODEM unit 230 may comprise PSK signaling units employing, for example, (data rate dependent) BPSK/QPSK/MSK modulation. Thus, the frame relay switch 210 provides for dynamic routing of signals between one or more terminal devices to which ports 211 are coupled, and one or more modulators and demodulators of MODEM unit 230 to which ports 221 are coupled.

MODEM unit 230 is coupled to an attendant RF transceiver unit 240 which is ported to a satellite uplink/downlink antenna unit 250. As a non-limiting example, the respective components of modem unit 230 may interface signals with RF transceiver unit 240 at a frequency on the order of 70MHz, while the satellite communication signals emitted by and received by RF transceiver unit 240 may fall within bandwidth of 11–14.5 GHz. RF transceiver unit 240 preferably employs a single channel per carrier (SCPC) signaling format, although time division multiple access (TDMA) may be used also. In the downlink direction received (SCPC) signals are coupled through a splitter 260 to the demodulators 232, 233 and 234 of MODEM 230.

As described in the above-cited patent, to optimize traffic flow among terminal devices (voice, data, video equipments) served by the frame relay switch, the routing control mechanism employed by the frame switch relay's microcontroller also includes priority queuing, which provides a plurality (e.g. three for the three types of terminal device signaling services of the present example (voice, data, video)) of queuing levels to control queuing delay through the frame relay switch 210. In particular, voice frames may be given highest priority, video teleconferencing frames the next highest priority, and data frames lowest priority. The queuing mechanism may be defined such that during normal operation, the frame relay switch 210 will not have more offered traffic than the aggregate outbound channel can handle. Priority queuing has effectively no impact on the sequence of transmitted frames. Where the offered load increases or the channel error rate exceeds prescribed limits, the priority queuing mechanism is operative to reduce the load impact on video teleconferencing first and then voice signaling traffic.

In the network of FIG. 2, the hub station 21 continuously monitors each downlink channel (associated with respective demodulators 231, 232 and 233) for message frames that may be addressed to it. In order to reduce signal processing housekeeping that would otherwise be executed on data frames that are not intended for a destination terminal device served by the hub station, the port configuration parameters of the frame relay switch 210 may be employed to define a bit mask, as described in the above-referenced patent. This bit mask is employed by the frame relay switch's microcontroller to 'filter' and selectively discard or pass frames based upon a portion of or the entirety of the first byte of the frame relay address. Such a mask feature allows only downlinked frames from multiple inbound channels that are destined for one or more terminal devices served by the hub station to be accepted and processed by the frame relay switch 210. This preliminary filtering reduces processing load and increases efficiency of the routing through the frame relay switch.

The architecture of a respective remote station will be described with reference to remote station 22, as an illustrative example, it being understood that each of remote stations 22, 23 and 24 is identically configured. Like the hub station 21, remote station 22 also includes a frame relay protocol-based switch 310, which is operative, under microprocessor control, to provide bidirectional signal transport connectivity between signal transport links 312 that are coupled between ports 311 and user interface equipment (not shown) and modulator and demodulator components associated with the remote station's satellite communication RF transceiver. As in the hub station 21, signal transport links 312 may include links of the type described in the above-referenced patent, such as voice signal links, a plurality of data links, and a video link. In addition, for each remote station, one of user interfaces comprises a demodulator control processor 314, which is used to tune the remote station's tunable demodulator to a frequency specified in a control message from the hub station, as will be described.

On its satellite link or transceiver-modem side, the frame relay switch 310 of a respective remote station has a second plurality of terminal ports 321, that are coupled via links 322 to modulator and demodulator circuits contained within a modulator/demodulator (MODEM) unit 330. MODEM unit 330 includes a single modulator 331, and a plurality (two in the present example) of demodulators 332 and 333. One of these demodulators—demodulator 332 in the illustrated example, is a dedicated master or hub-referenced demodulator that is continuously tuned to receive signals at the transmission frequency and bit rate employed by the hub station's modulator 231, for sourcing demodulator-programming control messages intended for respective participants of a remote station-to-remote station satellite link. Since each remote station's hub-dedicated demodulator 332 is continuously tuned to the hub-station's carrier frequency, any telephone calls or data transmission between any remote station and the hub station can proceed without a demand-based call set-up mechanism for remote-to-remote calls, to be described.

In addition to hub-dedicated demodulator 332, each remote station also includes at least one additional frequency-programmable demodulator, one being shown at 333, which is controllably programmable by the demodulator control processor 314 to the transmission frequency and bit rate of another remote station, in response to a control message from the hub station 21 that has been downlinked from the master demodulator 332, as will be described. To provide additional connectivity, a remote station may include more than one programmable demodulator 333. The choice of installing more than one demodulator will depend upon resource usage. For example, a remote station serving a large number of users may have the need for more than one programmable demodulator, as contrasted with a remote station at a 'mountain-top' industrial site, that is used only occasionally or intermittently, and therefore is very adequately served by a single programmable demodulator.

As in the hub station, the MODEM unit 330 of a remote station is coupled to an attendant RF transceiver unit 340, which is ported to a satellite uplink/downlink antenna unit 350. In the downlink direction received signals are coupled through a splitter 360 to the demodulators 332 and 333. As in the hub station, the respective components of modem unit 330 may interface signals with RF transceiver unit 340 at a frequency on the order of 70 MHz, while the communication signals emitted by and received by RF transceiver unit 340 may fall within bandwidth of 11–14.5 GHz. Again, RF transceiver unit 340 preferably operates with single channel per carrier (SCPC) signaling format, although time division multiple access (TDMA) may be used.

Also, as in hub station 21, in order to optimize traffic flow among terminal devices (voice, data, video equipments) served by the frame relay switch 330, the routing control mechanism employed by the frame relay switch's microcontroller preferably includes priority queuing, which provides prescribed queuing levels to control queuing delay through the frame relay switch 310. As described previously, the queuing mechanism is defined such that during normal operation, the frame relay switch will not have more offered traffic than the aggregate outbound channel can handle. Also, the amount of housekeeping on data frames not directed to a destination terminal device served by the remote station may be reduced by using the port configuration parameters of the frame relay switch 310 to define a bit mask.

OPERATION

Figure 3:
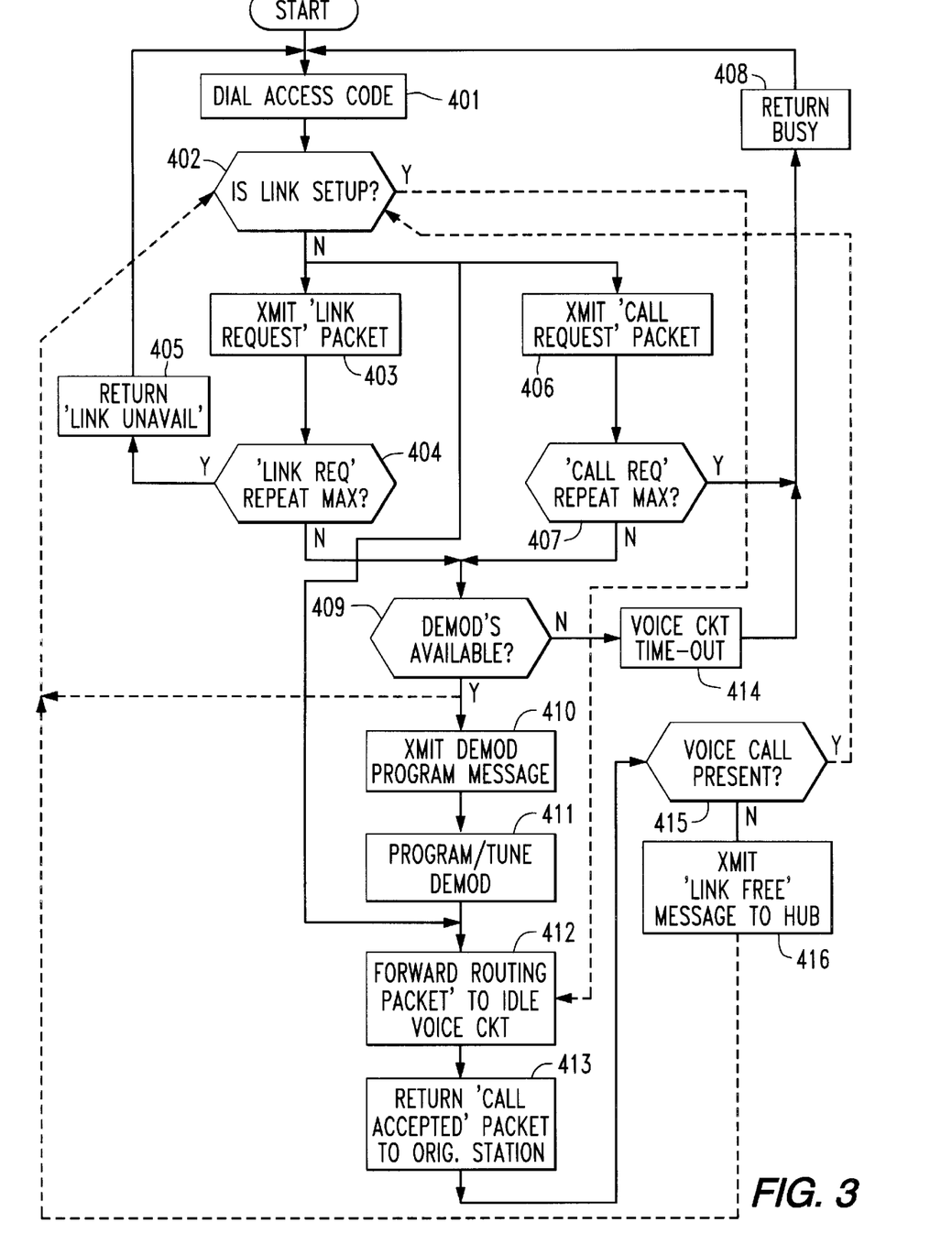
FIG. 3 is a flow chart illustrating respective steps of the communication establishment routine employed in the network of FIG. 2, for routing a telephone call through the network from a call 'originating' remote station to a call 'destination' remote station.

Attention is now directed to FIG. 3, which shows the respective steps of the communication establishment routine for establishing a connectivity path and routing a telephone call through the network from a call 'originating' remote station to a call 'destination' remote station of the network of FIG. 2. To initiate the placement of a call, at step 401 a customer served by the originating remote station dials a prescribed access code. As described above, the supervisory microcontroller associated with each remote station's frame relay switch 310 stores table entries indicating whether there currently exists an active link to the called or destination station.

In query step 402, these table entries are examined by the originating station's communication control processor to determine whether a link already exists between the originating station and the destination station, so that there is no need to set up the link. If the answer to query step 402 is NO (no link is currently set up), then, in step 403, the originating station's control processor 314 responds to the dialed access code, by generating a 'link request' packet for transmission to the hub station, and designating which remote station is the 'destination' station. However, if a link has already been established, the originating station's control processor does not generate this 'link request' packet; instead, as shown at step 412, a 'call routing' packet is forwarded to an idle voice circuit, and the voice circuit seizes a line, as will be described.

Where no link currently exists, in step 403 the control processor 314 of the originating station asserts the 'link request' packet for repeated transmission over the network to the hub station 21, at a predetermined repetition rate (every n seconds), for a prescribed number (nn) of repeat tries or until the hub station establishes a connectivity path through the network between the originating and destination stations, and the call is received and processed by the destination station.

For this purpose, for each repeated transmission of a 'link request' packet, in query step 404, the value of a 'link request' counter is examined to determine whether its value indicates that the predetermined number of repeat tries has been reached. As non-limiting examples, this may be accomplished by either loading a 'link request' packet soft-counter with a maximum repeat value (nn) and decrementing the soft-counter with each repeat transmission towards a rollover occurrence, or initially clearing the counter and incrementing its value toward (nn) with each repeat transmission. If the total number of repeats is equal to (nn) before a link is established, a 'link not-available' or busy message is returned to the terminal device, as shown by step 405.

In addition to transmitting a 'link request' packet in step 403, in step 406, the originating station also transmits a 'call request' packet over the network for delivery to the destination station. Again, this 'call request' is repeatedly transmitted until the hub station establishes a connectivity path through the network between the originating and destination stations, and the call is received and processed by the destination station, or until predetermined number of repeat tries have been completed.

To this end, similar to the processing of a 'link request' packet described above, in step 407 at each transmission of a 'call request' packet, the value of a 'call request' counter is examined to determine whether its value indicates that the predetermined number of repeat tries has been reached. Again, this may be accomplished by either loading a soft-counter with a prescribed maximum repeat value and decrementing the soft-counter with each repeat transmission towards a rollover occurrence, or initially clearing the counter and incrementing its value toward with each repeat transmission. If the total number of repeat transmissions of a 'call request' packet becomes equal to a prescribed value before the hub station establishes a connectivity path through the network between the originating and destination stations, as described above, a busy message is returned to the terminal device, as shown by step 408.

In order to establish a connectivity path through the network between the originating and destination stations, in query step 409 the hub station's NMF computer 215 examines the network configuration database, to determine whether a programmable demodulator in each of the originating and remote stations is available. If the answer to query step 409 is YES (there is an available programmable demodulator in each of the originating and destination stations), the hub station's NMF computer 215 assembles a demodulator programming message for transmission to each of the originating and destination stations, in step 410.

In response to receiving a demodulator programming message, the control processor 314 of each of the originating and destination stations supplies a demodulator control code to the frequency-programmable demodulator 333, as shown by step 411, thereby tuning a respective programmable demodulator 330 at each originating and destination station to the transmission frequency of the other remote station's modulator, and thereby establishing a bidirectional communication connectivity path between the originating and destination stations.

With a bidirectional communication connectivity path now established between the originating and destination stations, the call request packet generated in step 406 and downlinked to the destination station will be coupled through the frame relay switch 310 to the destination station's control processor, and the processor forwards a 'call routing' packet to an idle voice circuit, as shown by step 412. The voice circuit then seizes a line, to complete a communication path between the calling terminal device at the originating station and the called terminal device at the destination station. In addition to forwarding this call request packet to an idle voice circuit, the destination station's control processor also causes a 'call accepted' packet, containing information representative of the completed path, to be returned to the originating station, as shown by step 413.

As pointed out above, if a link has already been established between the originating station and the destination station, the answer to the link set-up query step 402, described above, is YES, and the originating station's control processor 314 will not generate a 'link request' packet. Instead, since a link is already established between the originating and destination stations, a 'call routing' packet will be forwarded in step 412 to an idle voice circuit, and the call proceeds as described above.

If the answer to the link/demodulator availability query step 409 is NO, indicating that one or both of the originating and destination stations contains no currently available tunable demodulator (at least one is in use with another station in the network), the voice circuit in the originating station will time out, as shown by time-out step 414, causing a busy signal to be returned to the calling party's telephone (step 408).

Once the programmable demodulator in each of the originating and destination stations has been tuned to the transmission frequency of the other remote station's modulator, these programmable demodulators will continue to be tuned to their assigned frequencies as long as any voice call is present, as shown by a YES answer to query step 415.

As a consequence, even if the call that initiated the call establishment sequence described above is terminated, as long as there is another call between the two stations on the established link, the link will be maintained and programmed demodulators will be restricted from being tuned to another station.

In response to a NO answer to query step 415 indicating that there is no longer any traffic between the originating and destination stations, the control processor 314 in the originating station forwards a 'link free' message to the hub station 21, signifying that all traffic between the linked originating and destination stations has been completed, as shown by step 416. In response to step 416, the hub station's NMF computer updates the network configuration database in step 416, thereby allowing the programmable demodulators 333 in the originating and destination stations to be allocated for other links as required.

As described above with reference to the network of FIG. 2, in accordance with a first aspect of the present invention, where a remote station can be expected to be relatively busy (its demand for service with other remote stations is frequent rather than only occasional), that remote station is continuously directly linked with the (control point) hub station by a dedicated uplink (from the remote station) carrier. The dedicated carrier frequencies from respective remote stations are continuously monitored by the hub station's network management facility for incoming request-for-service message frames from the one or more of the remote stations of the network, and respective programmable demodulators are controllably tuned by the hub station's network management facility computer.

On the other hand, where the traffic characteristics of the remote station are infrequent (such as only a few times a day) and, once serviced, such 'limited traffic' or 'thin route' stations are active for a only short period of transmit time, rather than pre-assign or dedicate a respective outbound carrier to such a remote station, no outbound carrier (and also no inbound carrier) is initially assigned. Instead, as illustrated diagrammatically in the reduced complexity demand-based connection management satellite communication network of FIG. 4, each remote station, three of which are shown at 42, 43 and 44, has a MODEM unit 400 which contains a tunable modulator 410 and tunable demodulator 420, plus a separate hub-sourced control carrier demodulator 430.

Figure 4:
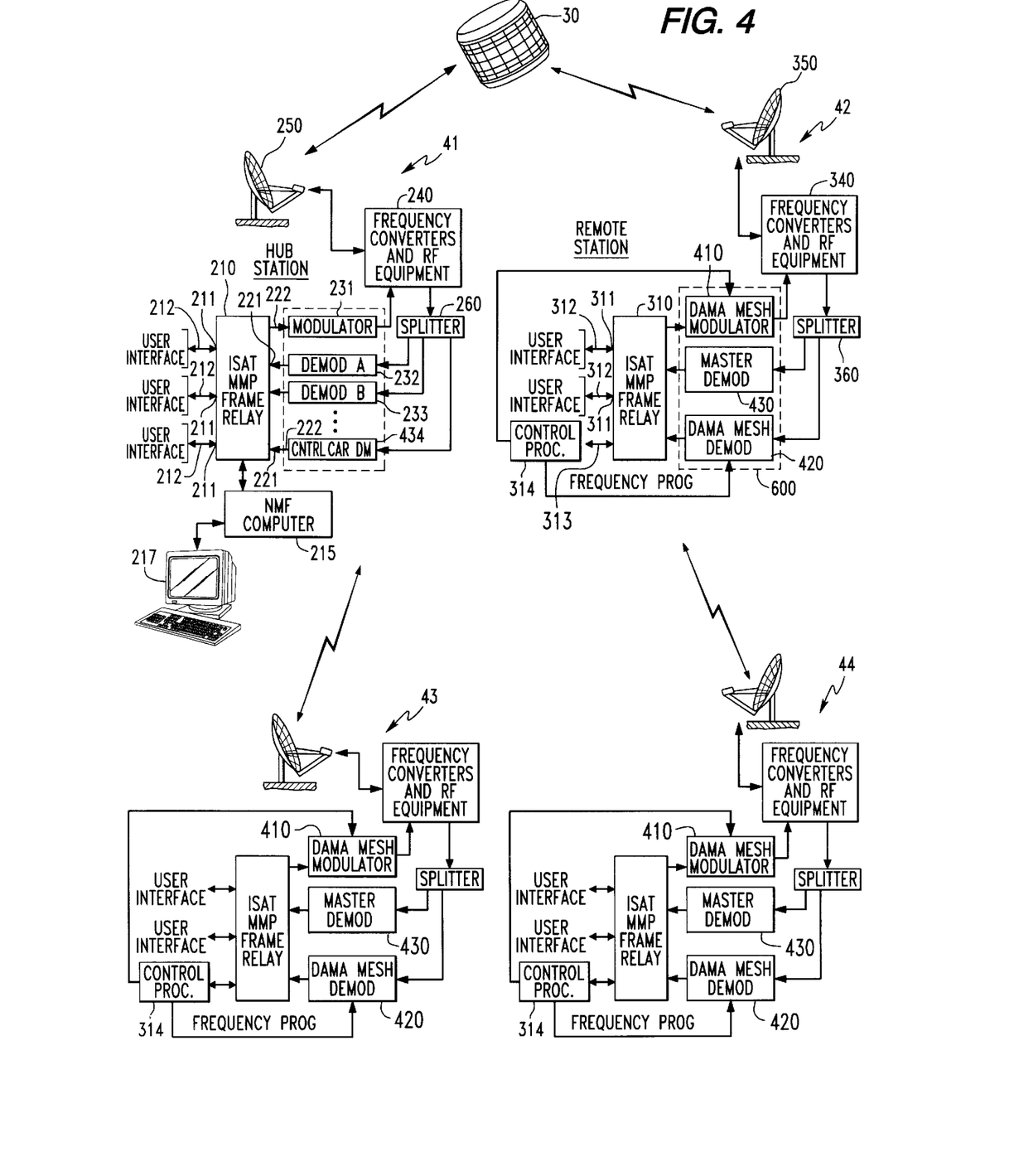
FIG. 4 diagrammatically illustrates a reduced complexity demand-based connection management satellite communication network having a hub station and a plurality of remote stations, wherein each remote station employs programmable modulator and demodulator components.

The dedicated hub-sourced control carrier demodulator 430 is similar to demodulator 332 in the network architecture of FIG. 2, in that it is fixedly tuned to receive signals at the control carrier frequency and at the bit rate employed by the hub station's control modulator 231, which sources both modulator and demodulator-programming control messages intended for respective participants of a 'thin route' remote station-to-remote station satellite link.

As in the demand-based connection management satellite network of FIG. 2, each earth station of the network of FIG. 4 also includes a frame relay protocol-based integrated services access terminal interface of the type described in the above-referenced patent. The hardware components of the hub station 41 of the network of FIG. 4 are the same as those of the hub station 21 in the network of FIG. 2, with its frame relay protocol-based integrated services access terminal interface 210 providing bidirectional signal transport connectivity between signal transport links that are coupled to a plurality of terminal devices and modulator and demodulator components associated with a satellite communication RF transceiver circuitry, as described above.

To implement the augmented functionality of assigning both uplink and downlink carriers to the reduced traffic remote stations of FIG. 4, the network connectivity database maintained by the hub station's NMF computer 215 also includes a list or pool of carrier frequencies available for use by the various reduced traffic remote stations of the network, plus an indication of the availability of tunable components in each remote station.

To monitor control link-sourced service requests from any of the (three) remote earth stations 42, 43 and 44 of the network of FIG. 4, one of the demodulators within the hub station's MODEM unit 230 includes a dedicated control carrier demodulator 434. In the augmented network configuration of FIG. 4, the hub station 21 continuously monitors the control carrier (that may be selectively accessed by any of the remote stations) for a request for service message that may be addressed to it from any of the remote stations.

The architecture of a respective remote station will be described with reference to remote station 42, as a non-limiting example, it being understood that each of the other 'thin route' or 'limited traffic' remote stations 43 and 44 is identically configured to remote station 42. As in the remote station architecture of FIG. 2, the remote station's microprocessor-controlled frame relay protocol-based switch 310 provides bidirectional signal transport connectivity between signal transport links 312 coupled between ports 311 and user interface equipment and modulator and demodulator components associated with the remote station's satellite communication RF transceiver.

In response to a request for service from a user equipment servicing port, the modulator/demodulator control processor 314 is operative to tune the remote station's tunable modulator 410 to the control carrier, so that a request for connectivity with a called station may be transmitted via the control carrier to the hub station 21. In response to a service request control message sourced from the hub station's NMF, modulator/demodulator control processor 314 then tunes the remote station's tunable modulator 410 to an outbound transmission frequency and its tuneble demodulator 420 to an inbound carrier frequency, associated with the inbound and outbound carrier frequency pair of the called station. The hub station has a sufficient number of tunable demodulators that are tuned by the NMF when a carrier frequency is assigned to a remote station.

OPERATION

Figure 5:
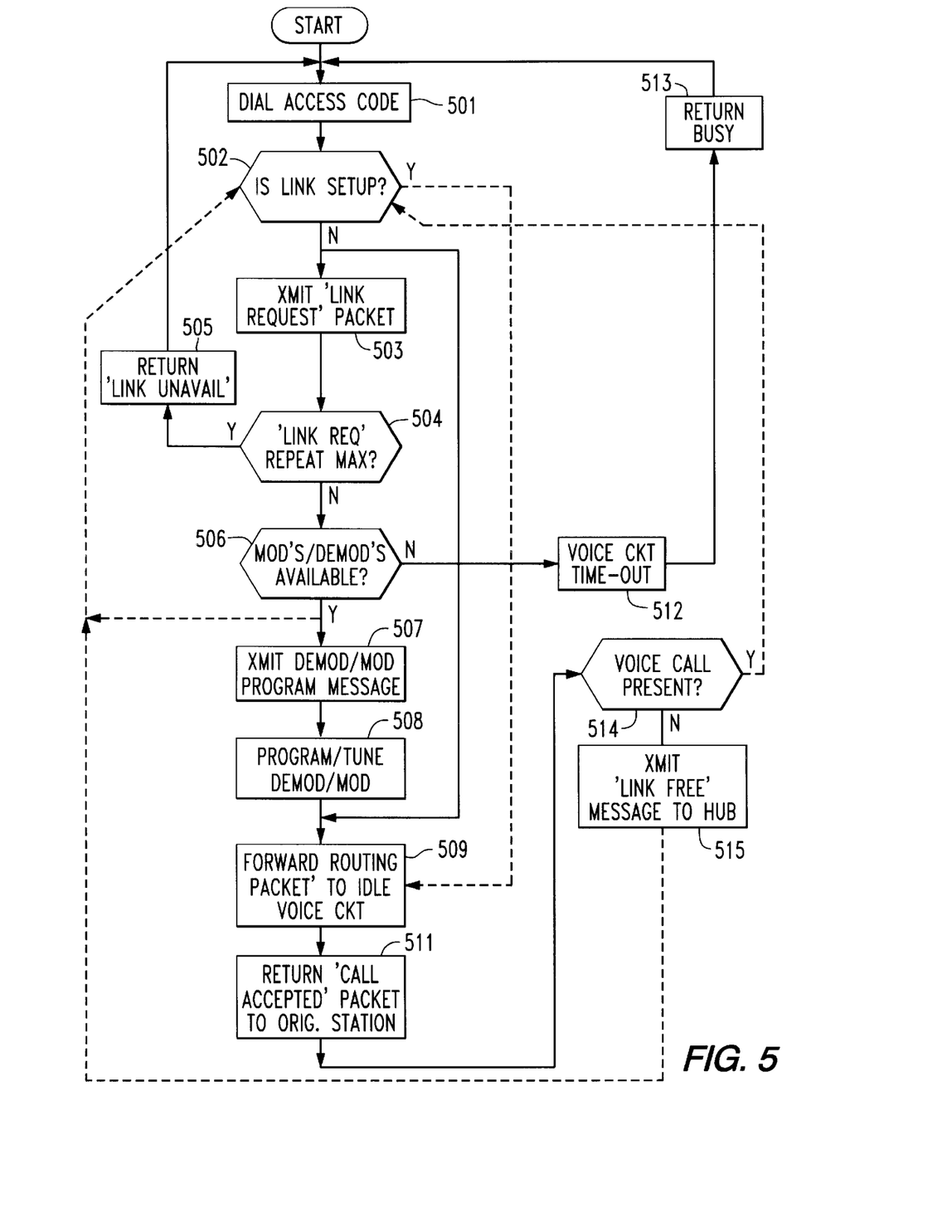
FIG. 5 is a flow chart illustrating respective steps of the communication establishment routine employed in the network of FIG. 4.

Attention is now directed to FIG. 5, which shows the respective steps of the communication establishment routine for establishing a connectivity path and routing a telephone call through the network from a call 'originating' remote station to a call 'destination' remote station of the 'thin route' network of FIG. 4. To initiate the placement of a call, at step 501 a customer served by the originating remote station dials a prescribed access code. As described above, the supervisory microcontroller associated with each remote station's frame relay switch 310 stores table entries indicating whether there currently exists an active link to the called or destination station.

In query step 502, these table entries are examined by the originating station's communication control processor to determine whether a link already exists between the originating station and the destination station, so that there is no need to set up the link. If the answer to query step 502 is NO (no link is currently set up), then, in step 503, the originating station's control processor 314 responds to the dialed access code, by generating a 'link request' packet for transmission over the control carrier to the hub station, and designating which remote station is the 'destination' station. However, if a link has already been established, the originating station's control processor does not generate this 'link request' packet; instead, as shown at step 512 a 'call routing' packet is forwarded to an idle voice circuit, and the voice circuit seizes a line, as will be described.

Where no link currently exists, in step 503 the control processor 314 of the originating station proceeds to assert the 'link request' packet for repeated transmission via the control carrier to the hub station 21, at a predetermined repetition rate (every n seconds), for a prescribed number (nn) of repeat tries or until the hub station establishes a connectivity path through the network between the originating and destination stations, and the call is received and processed by the destination station.

For this purpose, for each repeated transmission of a 'link request' packet on the control carrier, in query step 504, the value of a 'link request' counter is examined to determine whether its value indicates that the predetermined number of repeat tries has been reached. As non-limiting examples, this may be accomplished by either loading a 'link request' packet soft-counter with a maximum repeat value (nn) and decrementing the soft-counter with each repeat transmission towards a rollover occurrence, or initially clearing the counter and incrementing its value toward (nn) with each repeat transmission. If the total number of repeats is equal to (nn) before a link is established, a 'link not-available' or busy message is returned to the terminal device, as shown by step 505.

In order to establish a connectivity path through the network between the originating and destination stations, in query step 506 the hub station's NMF computer 215 examines the network configuration database, to determine sufficient idle carrier frequencies and whether the programmable modulator and demodulator pair in each of the originating and remote stations is currently available. If the answer to query step 506 is YES (there is an available programmable modulator and demodulator pair in each of the originating and destination stations), the hub station's NMF computer 215 assembles a modulator and demodulator pair programming message for transmission to each of the originating and destination stations, in step 507.

In response to receiving a modulator, demodulator programming message, the control processor 314 of each of the originating and destination stations supplies modulator and demodulator control codes to the frequency-programmable modulator/demodulator pair 510/520, as shown by step 508, thereby tuning a respective programmable modulator 510 at each originating and destination remote station to respective outbound carriers, and their demodulators 520 to the transmission frequency of the other remote station's programmed modulator, thus establishing a bidirectional communication connectivity path between the originating (calling) and destination (called) remote stations.

With a bidirectional communication connectivity path now established between the originating and destination stations, a call request packet generated at the calling station will be downlinked to the called station and be coupled through the frame relay switch 310 to the destination station's control processor, whereupon the called station's processor forwards a 'call routing' packet to an idle voice circuit, as shown by step 509. The voice circuit then seizes a line, to complete a communication path between the calling terminal device at the originating station and the called terminal device at the destination station. In addition to forwarding this call request packet to an idle voice circuit, the destination station's control processor also causes a 'call accepted' packet, containing information representative of the completed path, to be returned to the originating station, as shown by step 511.

As pointed out above, if a link has already been established between the originating station and the destination station, the answer to the link set-up query step 502, described above, is YES, and the originating station's control processor 314 will not generate a 'link request' packet. Instead, since a link is already established between the originating and destination stations, a 'call routing' packet will be forwarded to an idle voice circuit in step 509, and the call proceeds as described above.

If the answer to the link/demodulator availability query step 506 is NO, indicating that one or both of the originating and destination stations contains no currently available tunable modulator/demodulator pair (already in use with another station in the network), the voice circuit in the originating station will time out, as shown by step 512, causing a busy signal to be returned to the calling party's telephone (step 513).

Once the programmable modulator and demodulator pair in each of the originating and destination stations has been tuned to the carrier frequency pair to be used in the communication exchange, it will continue to be tuned to the assigned frequencies as long as any voice call is present, as shown by a YES answer to query step 514. As a consequence, even if the call that initiated the call establishment sequence described above is terminated, as long as there is another call between the two stations on the established carrier pair, that carrier pair, or link, will be maintained and the programmed modulator and demodulator pair will be restricted from being tuned to another carrier pair.

In response to a NO answer to query step 514, indicating that there is no longer any traffic between the originating and destination stations, the control processor 314 in the originating station forwards a 'link free' message to the hub station 21, signifying that all traffic between the linked originating and destination stations has been completed, as shown by step 515. In response to step 515, the hub station's NMF computer 215 updates the network configuration database, thereby allowing the programmable modulator and demodulator pair in the originating and destination stations to be allocated for other links as required.

From the foregoing description it will be appreciated that the hardware complexity and attendant cost of installing, in each station of the network, a separately dedicated demodulator for every other station in the network is significantly reduced by the demand-based connection management mechanism of the present invention. By incorporating a hub station, the network is converted into a star-mesh connectivity configuration. Since the demodulator composition of the modem of each remote station can be reduced to only two demodulators—one dedicated for permanent call establishment control communications with the hub station, and the other being programmable demodulator for hub-controlled connectivity with any other remote station, the demand-based connection management ISAT earth station architecture of the present invention constitutes a cost effective application of system resources for serving the needs of both majority of the time and occasional users.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of providing communication connectivity between any two of a plurality of geographically distributed terminal devices by way a satellite communication network having a communication satellite comprising the steps of:
   (a) providing a plurality of geographically distributed earth stations, each earth station having a frame relay protocol-based switch for interfacing message signals between terminal devices served by said each earth station and a modulator and demodulators employed by said each earth station, said modulator having a transmission carrier frequency associated with said each earth station;
   (b) coupling said modulator to an uplink port of the frame relay protocol-based switch of said each earth station;
   (c) installing at one of said earth stations, termed a hub station, a plurality of demodulators, each of which is operative to demodulate messages modulated on carrier frequencies transmitted from other earth stations, termed remote stations, and coupling respective ones of said plurality of demodulators to respectively different downlink ports of the frame relay protocol-based switch of said hub station;
   (d) at each remote station, installing a tunable demodulator which is operative to demodulate messages modulated on a carrier frequency transmitted from another earth station, and coupling said tunable demodulator to a downlink port of the frame relay protocol-based switch of said each remote station;
   (e) in response to a request from a terminal device coupled to an originating remote station of said remote stations for communication connectivity with a terminal device coupled to a destination remote station of said remote stations, causing the modulator of said originating remote station to transmit a communication connectivity request message to said hub station; and
   (f) at said hub station, in response to said communication connectivity request message, transmitting to said originating remote station an originating remote station demodulator tuning message for causing the tunable demodulator at said originating remote station to be tuned to the transmission carrier frequency associated with said destination remote station, and transmitting to said destination remote station a destination remote station demodulator tuning message for causing the tunable demodulator at said destination remote station to be tuned to the transmission carrier frequency associated with said originating remote station.

2. A method according to claim 1, where step (d) further comprises installing a further demodulator at said each remote station, said further demodulator being tuned to the transmission carrier frequency associated with hub station, and being operative to demodulate a demodulator tuning message transmitted thereto from said hub station.

3. A method according to claim 1, wherein step (a) comprises coupling a plurality of terminal device ports of said frame relay protocol-based switch to terminal devices served by said each earth station.

4. A method according to claim 1, wherein step (f) further comprises transmitting, as part of said originating remote station demodulator tuning message, information representative of the bit rate of messages modulated on the transmission carrier frequency associated with said destination remote station, and transmitting as part of said destination remote station demodulator tuning message, information representative of the bit rate of messages modulated on the transmission carrier frequency associated with said originating remote station.

5. A method according to claim 1, further including the step of:
   (g) at said destination remote station, causing the frame relay protocol-based switch of said destination remote station to controllably route a downlink-directed message coupled thereto from a demodulator thereof to a virtual port for coupling to a terminal device, said virtual port being selected in accordance with the contents of said downlink-directed message signals.

6. A method according to claim 5, wherein a terminal device port is coupled to a terminal device multiplexer, which controllably interfaces message signals between a plurality of virtual ports and a terminal device port.

7. A method according to claim 5, wherein a terminal device port is coupled to an audio signalling circuit multiplexer which controllably interfaces audio message signals between a plurality of virtual ports and terminal device port.

8. A method according to claim 1, wherein said terminal devices include audio, data and video signaling devices.

9. A method according to claim 5, wherein said terminal devices include audio, data and video signalling devices and wherein step (g) comprises causing said frame relay protocol-based switch to route message signals therethrough such that audio frames are given highest priority, video teleconferencing frames are given the next highest priority, and data frames are given lowest priority.

10. A method according to claim 1, wherein step (d) comprises installing a first demodulator at said each remote station, said first demodulator being tuned to the transmission carrier frequency associated with said hub station, and being operative to demodulate a demodulator tuning-message transmitted thereto from said hub station, and a second demodulator which is operative to demodulate messages modulated on a carrier frequency transmitted from another earth station, and coupling said second demodulator to a downlink port of the frame relay protocol-based switch of said each remote station, and wherein step (f) comprises, in response to said communication connectivity request message, transmitting to said originating remote station an originating remote station demodulator tuning message for causing the second demodulator at said originating remote station to be tuned to the transmission carrier frequency associated with said destination remote station, and transmitting to said destination remote station a destination remote station demodulator tuning message for causing the second demodulator at said destination remote station to be tuned to the transmission carrier frequency associated with said originating remote station.

11. A method according to claim 10, wherein said each earth station includes a communication control processor associated with said each remote station's frame relay switch which stores table entries indicating whether there currently exists an active communication link to said destination station, and wherein step (e) comprises, in response to a call being placed from a terminal device, causing said communication control processor to examine said table entries and, in response to said table entries indicating no existing active communication link, generating a link request message for transmission to said hub station, said link request message designating which remote station is the destination station.

12. A method according to claim 11, wherein step (e) comprises repeatedly transmitting said link request message at a predetermined repetition rate for a prescribed number of repeat tries.

13. A method according to claim 11, wherein step (e) further comprises, in response to said table entries indicating the existence of an active communication link between said originating and destination remote stations, causing said originating remote station's control processor to forward a call routing message to an idle voice circuit in said destination remote station, so that said idle voice circuit may seize a line to a called terminal device and thereby complete a communication path between a calling terminal device at the originating remote station and said called terminal device at the destination remote station.

14. A method according to claim 11, wherein step (e) further comprises transmitting a call request message over said active communication link between said originating and destination remote stations, said call request message being repeatedly transmitted a predetermined number of times, or until the hub station establishes a communication link through said network between the originating and destination remote stations, and the call is received and processed by said destination remote station.

15. A method according to claim 11, wherein said hub station includes a network management facility computer and an associated network configuration database, and wherein, in step (f), said network management facility computer examines a network configuration database, to determine availability of a tunable demodulator in each of the originating and destination remote stations.

16. A method according to claim 15, wherein step (f) further comprises, in response to either or both of said originating and destination remote stations containing no available tunable demodulator, causing a voice circuit in said originating remote station to time out, returning a busy signal to a calling party's telephone.

17. A method according to claim 14, wherein step (f) further comprises coupling a call request message received by said destination remote station to be coupled through its frame relay switch to the destination remote station's control processor, said destination remote station's control processor forwarding a call routing packet to an idle voice circuit, so that said idle voice circuit may seize a line to a called terminal device and thereby complete a communication path between a calling terminal device at the originating remote station and said called terminal device at the destination remote station.

18. A method according to claim 17, wherein step (f) further comprises causing said destination remote station to return a call accepted message containing information representative of the established communication link to said originating remote station.

19. A method according to claim 18, wherein step (f) further comprises causing the tunable demodulators in each of the originating and destination remote stations to be maintained tuned to their assigned frequencies as long as any voice calls are present.

20. A method according to claim 19, wherein step (f) further comprises in response to termination of call traffic between said originating and destination remote stations, causing said originating remote station to forward a message to said hub station, indicating that all traffic between the linked stations has been completed, and causing said hub station's network management facility computer to update its network configuration database, so as to allow said tunable demodulators in said originating and destination remote stations to be tuned to frequencies associated with other remote stations.

21. A satellite communication system for providing communication connectivity between any two of a plurality of geographically distributed terminal devices by way a satellite communication network having a communication satellite comprising:

a plurality of geographically distributed earth stations, each earth station having a frame relay protocol-based switch for interfacing message signals between terminal devices served by said each earth station and a modulator and demodulators installed in said each earth station;

said modulator having a transmission carrier frequency associated with said each earth station, and being coupled to an uplink port of the frame relay protocol-based switch of said each earth station;

one of said earth stations, termed a hub station, having a plurality of demodulators, each of which is operative to demodulate messages modulated on carrier frequencies transmitted from other earth stations, termed remote stations, and being coupled to respectively different downlink ports of the frame relay protocol-based switch of said hub station;

each remote station having a tunable demodulator which is operative to demodulate messages modulated on a carrier frequency transmitted from another earth station, and being coupled to a downlink port of the frame relay protocol-based switch of said remote station; and wherein in response to a request from a terminal device coupled to an originating remote station of said remote stations for communication connectivity with a terminal device coupled to a destination remote station of said remote stations, the modulator of said originating remote station being operative to transmit a communication connectivity request message to said hub station; and wherein said hub station, in response to said communication connectivity request message, being operative to transmit, to said originating remote station, an originating remote station demodulator tuning message for causing the demodulator at said originating remote station to be tuned to the transmission carrier frequency associated with said destination remote station, and to transmit, to said destination remote station, a destination remote station demodulator tuning message for causing the demodulator at said destination remote station to be tuned to the transmission carrier frequency associated with said originating remote station.

22. A satellite communication system according to claim 21, wherein said each remote station includes a further demodulator which is operative to demodulate a demodulator tuning message transmitted thereto on the transmission carrier frequency associated with said hub station.

23. A satellite communication system according to claim 21, wherein a plurality of terminal device ports of said frame relay protocol-based switch are coupled to terminal devices served by said each earth station.

24. A satellite communication system according to claim 21, wherein said hub station is operative to transmit, as part of said originating remote station demodulator tuning message, information representative of the bit rate of messages modulated on the transmission carrier frequency associated with said destination remote station, and to transmit as part of said destination remote station demodulator tuning message, information representative of the bit rate of messages modulated on the transmission carrier frequency associated with said originating remote station.

25. A satellite communication system according to claim 21, wherein the frame relay protocol-based switch of said destination remote station is operative to cause the frame relay protocol-based switch of said destination remote station to controllably route a downlink-directed message coupled thereto from a demodulator thereof to a virtual port for coupling to a terminal device, said virtual port being selected in accordance with the contents of said downlink-directed message signals.

26. A satellite communication system according to claim 25, wherein a terminal device port is coupled to a terminal device multiplexer which controllably interfaces message signals between a plurality of virtual ports and a terminal device port.

27. A satellite communication system according to claim 25, wherein a terminal device port is coupled to an audio signaling circuit multiplexer which controllably interfaces audio message signals between a plurality of virtual ports and terminal device port.

28. A satellite communication system according to claim 21, wherein said terminal devices include audio, data and video signaling devices.

29. A satellite communication system according to claim 25, wherein said terminal devices include audio, data and video signaling devices and wherein said frame relay protocol-based switch is operative to route message signals therethrough such that audio frames are given highest priority, video teleconferencing frames are given the next highest priority, and data frames are given lowest priority.

30. A satellite communication system according to claim 21, wherein said hub station is operative to store information representative of whether the tunable demodulator of said originating remote station and the tunable demodulator of said destination remote station are available for establishing communication connectivity between said originating and destination earth stations.

31. A satellite communication system according to claim 21, wherein a respective remote earth station is operative to store information representative of whether communication connectivity exists between said respective remote station and another remote earth station.

32. A satellite communication system according to claim 21, wherein said each remote station includes a first demodulator that is tuned to the transmission carrier frequency associated with hub station, and being operative to demodulate a demodulator tuning-message transmitted thereto from said hub station, and a second demodulator which is operative to demodulate messages modulated on a carrier frequency transmitted from another earth station, said second demodulator being coupled to a downlink port of the frame relay protocol-based switch of said each remote station, and wherein said hub station is operative, in response to said communication connectivity request message, to transmit, to said originating remote station, an originating remote station demodulator tuning message for causing the second demodulator at said originating remote station to be tuned to the transmission carrier frequency associated with said destination remote station, and to transmit, to said destination remote station, a destination remote station demodulator programming message for causing the second demodulator at said destination remote station to be tuned to the transmission carrier frequency associated with said originating remote station.

33. A satellite communication system according to claim 32, wherein said each earth station includes a communication control processor associated with said each remote station's frame relay switch which stores table entries indicating whether there currently exists an active communication link to said destination remote station, and which is operative, in response to a call being placed from a terminal device, for causing said communication control processor to examine said table entries and, in response to said table entries indicating no existing active communication link, for generating a link request message for transmission to said hub station, said link request message designating which remote station is the destination remote station.

34. A satellite communication system to claim 33, wherein said originating remote station is operative to repeatedly transmit said link request message at a predetermined repetition rate for a prescribed number of repeat tries.

35. A satellite communication system method according to claim 33, wherein said originating remote station is operative, in response to said table entries indicating the existence of an active communication link between said originating and destination remote stations, to forward a call routing message to an idle voice circuit in said destination remote station, so that said idle voice circuit may seize a line to a called terminal device and thereby complete a communication path between a calling terminal device at the originating remote station and said called terminal device at the destination remote station.

36. A satellite communication system according to claim 33, wherein said originating remote station is operative to transmit a call request message over said active communication link to said destination remote station, said call request message being repeatedly transmitted a predetermined number of times, or until the hub station establishes a communication link through said network between the originating and destination stations, and the call is received and processed by said destination remote station.

37. A satellite communication system according to claim 33, wherein said hub station includes a network management facility computer and an associated network configuration database, and wherein said network management facility computer is operative to examine a network configuration database, to determine availability of a tunable demodulator in each of said originating and destination remote stations.

38. A satellite communication system according to claim 37, wherein said originating remote station is operative, in response to either or both of said originating and destination remote stations containing no available tunable demodulator, to causing a voice circuit in said originating remote station to time out, and return a busy signal to a calling party's telephone.

39. A satellite communication system to claim 36, wherein said destination remote station is operative to couple a call request message received to be coupled through its frame relay switch to said destination remote station's control processor, said destination remote station's control processor forwarding a call routing packet to an idle voice circuit, so that said idle voice circuit may seize a line to a called terminal device and thereby complete a communication path between a calling terminal device at the originating remote station and said called terminal device at the destination remote station.

40. A satellite communication system according to claim 39, wherein said destination remote station is operative to return a call accepted message containing information representative of the established communication link to said originating remote station.

41. A satellite communication system according to claim 40, wherein said originating and destination stations are operative to maintain their tunable demodulators tuned to their assigned frequencies as long as any voice calls are present.

42. A satellite communication system according to claim 41, wherein said originating remote station, in response to termination of call traffic with said destination remote station, is operative to forward a message to said hub station, indicating that all traffic between the linked stations has been completed, and wherein said hub station's network management facility computer is operative to update its network configuration database, so as to allow said tunable demodulators in said originating and destination remote stations to be tuned to frequencies associated with other remote stations.

43. A method of providing communication connectivity between any two of a plurality of geographically distributed terminal devices by way a satellite communication network having a communication satellite comprising the steps of:

(a) providing a plurality of geographically distributed earth stations, each earth station having a frame relay protocol-based switch for interfacing message signals between terminal devices served by said each earth station and a modulator and demodulators employed by said each earth station;

(b) coupling said modulator to an uplink port of the frame relay protocol-based switch of said each earth station;

(c) installing at one of said earth stations, termed a hub station, a demodulator, which is operative to demodulate messages modulated on a control carrier frequency transmitted from other earth stations, termed remote stations, and coupling said demodulator to a downlink port of the frame relay protocol-based switch of said hub station;

(d) at each remote station, installing a tunable demodulator which is operative to demodulate messages modulated on a carrier frequency transmitted from another earth station, and coupling said tunable demodulator to a downlink port of the frame relay protocol-based switch of said each remote station;

(e) in response to a request from a terminal device coupled to an originating remote station of said remote stations for communication connectivity with a terminal device coupled to a destination remote station of said remote stations, causing the modulator of said originating remote station to transmit a communication connectivity request message to said hub station on said control carrier; and (f) at said hub station, in response to said communication connectivity request message, transmitting to said originating remote station an originating remote station tuning message for causing the modulator at said originating remote station to be tuned to a transmission carrier frequency associated with said originating remote station, and for causing the demodulator at said originating remote station to be tuned to the transmission carrier frequency associated with said destination remote station, and transmitting to said destination remote station a destination remote station tuning message for causing the tunable demodulator at said destination remote station to be tuned to the transmission carrier frequency associated with said originating remote station, and for causing the tunable modulator at said destination remote station to be tuned to the transmission carrier frequency associated with said destination remote station.

44. A method according to claim 43, where step (d) further comprises installing a further demodulator at said each remote station, said further demodulator being tuned to said control carrier frequency, and being operative to demodulate a tuning message transmitted thereto from said hub station.

45. A method according to claim 44, wherein step (a) comprises coupling a plurality of terminal device ports of said frame relay protocol-based switch to terminal devices served by said each earth station.

46. A method according to claim 43, wherein step (f) further comprises transmitting, as part of said originating remote station tuning message, information representative of the bit rate of messages modulated on the transmission carrier frequency associated with said destination remote station, and transmitting as part of said destination remote station tuning message, information representative of the bit rate of messages modulated on the transmission carrier frequency associated with said originating remote station.

47. A method according to claim 43, further including the step of:
(g) at said destination remote station, causing the frame relay protocol-based switch of said destination remote station to controllably route a downlink-directed message coupled thereto from a demodulator thereof to a virtual port for coupling to a terminal device, said virtual port being selected in accordance with the contents of said downlink-directed message signals.

48. A method according to claim 47, wherein a terminal device port is coupled to a terminal device multiplexer, which controllably interfaces message signals between a plurality of virtual ports and a terminal device port.

49. A method according to claim 43, wherein said terminal devices include audio, data and video signalling devices.

50. A method according to claim 43, wherein step (d) comprises installing a first demodulator at said each remote station, said first demodulator being tuned to the control carrier frequency associated with hub station, and being operative to demodulate a tuning-message transmitted thereto from said hub station, and a second demodulator which is operative to demodulate messages modulated on a carrier frequency transmitted from another earth station, and coupling said second demodulator to a downlink port of the frame relay protocol-based switch of said respective remote station,
and wherein step (f) comprises, in response to said communication connectivity request message, transmitting to said originating remote station an originating remote station tuning message for causing the second demodulator at said originating remote station to be tuned to the transmission carrier frequency associated with said destination remote station, and transmitting to said destination remote station a destination remote station tuning message for causing the second demodulator at said destination remote station to be tuned to the transmission carrier frequency associated with said originating remote station.

51. A method according to claim 50, wherein each earth station includes a communication control processor associated with said each remote station's frame relay switch which stores table entries indicating whether there currently exists an active communication link to said destination remote station, and wherein step (e) comprises, in response to a call being placed from a terminal device, causing said communication control processor to examine said table entries and, in response to said table entries indicating no existing active communication link, generating a link request message for transmission to said hub station, said link request message designating which remote station is the destination remote station.

52. A method according to claim 51, wherein said hub station includes a network management facility computer and an associated network configuration database, and wherein, in step (f), said network management facility computer examines a network configuration database, to determine availability of a tunable modulator and demodulator pair in each of the originating and destination remote stations and idle carrier frequencies.

53. A method according to claim 52, wherein step (f) further comprises causing tunable the modulator and demodulator pair in each of the originating and destination remote stations to be maintained tuned to their assigned frequencies as long as any calls are present.

54. A method according to claim 53, wherein step (f) further comprises in response to termination of call traffic between said originating and destination remote stations, causing said originating remote station to forward a message to said hub station, indicating that all traffic between the linked stations has been completed, and causing said hub station's network management facility computer to update its network configuration database command the remote stations modulators off and verify, so as to allow said tunable modulators and demodulators in said originating and destination remote stations to be tuned to frequencies associated with other remote stations and the carrier frequencies to be returned to an idle state for reassignment.

55. A satellite communication system for providing communication connectivity between any two of a plurality of geographically distributed terminal devices by way a satellite communication network having a communication satellite comprising:
a plurality of geographically distributed earth stations, each earth station having a frame relay protocol-based switch for interfacing message signals between terminal devices served by said each earth station and a modulator and demodulators installed in said each earth station;
said modulator being tunable to a transmission carrier frequency associated with said each earth station, and being coupled to an uplink port of the frame relay protocol-based switch of said each earth station;
one of said earth stations, termed a hub station, having a demodulator, which is operative to demodulate messages modulated on a control carrier frequency transmitted from other earth stations, termed remote stations, and being coupled to a downlink port of the frame relay protocol-based switch of said hub station;
each remote station having a tunable demodulator which is operative to demodulate messages modulated on a carrier frequency transmitted from another earth station, and a tunable modulator which is operative to modulate messages on a carrier frequency for transmission to another earth station, said tunable demodulator being coupled to a downlink port of the frame relay protocol-based switch of said remote station; and wherein
in response to a request from a terminal device coupled to an originating remote station of said remote stations for communication connectivity with a terminal device coupled to a destination remote station, the modulator of said originating remote station is operative to transmit a communication connectivity request message to said hub station on said control carrier frequency; and wherein
said hub station, in response to said communication connectivity request message, is operative to transmit, to said originating remote station, an originating remote station tuning message for causing the demodulator at said originating remote station to be tuned to the transmission carrier frequency associated with said destination remote station, and causing the modulator at said originating remote station to be tuned to the transmission carrier frequency associated with said originating remote station, and is operative to transmit, to said destination remote station, a destination remote station demodulator tuning message for causing the demodulator at said destination remote station to be tuned to the transmission carrier frequency associated with said originating remote station, and for causing the modulator at said destination remote station to be tuned to the transmission carrier frequency associated with said destination remote station.

56. A satellite communication system according to claim 55, wherein said each remote station includes a further demodulator which is operative to demodulate a tuning message transmitted thereto on said control carrier frequency from said hub station.

57. A satellite communication system according to claim 55, wherein a plurality of terminal device ports of said frame relay protocol-based switch are coupled to terminal devices served by said each earth station.

58. A satellite communication system according to claim 55, wherein said hub station is operative to transmit, as part of said originating remote station tuning message, information representative of the bit rate of messages modulated on the transmission carrier frequency associated with said destination remote station, and to transmit as part of said destination remote station tuning message, information representative of the bit rate of messages modulated on the transmission carrier frequency associated with said originating remote station.

59. A satellite communication system according to claim 55, wherein the frame relay protocol-based switch of said destination remote station is operative to cause the frame relay protocol-based switch of said destination remote station to controllably route a downlink-directed message coupled thereto from a demodulator whereof to a virtual port for coupling to a terminal device, said virtual port being selected in accordance with the contents of said downlink-directed message signals.

60. A satellite communication system according to claim 59, wherein a terminal device port is coupled to a terminal device multiplexer which controllably interfaces message signals between a plurality of virtual ports and a terminal device port.

61. A satellite communication system according to claim 55, wherein said terminal devices include audio, data and video signaling devices.

62. A satellite communication system according to claim 55, wherein said hub station is operative to store information representative of whether a tunable modulator—demodulator pair of said originating remote earth station and a tunable modulator—demodulator pair of said destination remote station are available for establishing communication connectivity between said originating and destination earth stations.

63. A satellite communication system according to claim 55, wherein said each remote earth station is operative to store information representative of whether communication connectivity exists between said each remote station and another remote earth station.

64. A satellite communication system according to claim 55, wherein said each remote station includes a first demodulator that is tuned to said control carrier frequency associated and is operative to demodulate a tuned-message transmitted thereto from said hub station, and a second, demodulator which is operative to demodulate messages modulated on a carrier frequency transmitted from another earth station, said programmable demodulator being coupled to a downlink port of the frame relay protocol-based switch of said respective remote station.

65. A satellite communication system according to claim 64, wherein said each earth station includes a communication control processor associated with said each remote station's frame relay switch, which stores table entries indicating whether there currently exists an active communication link to said destination station, and which is operative, in response to a call being placed from a terminal device, for causing said communication control processor to examine said table entries and, in response to said table entries indicating no existing active communication link, for generating a link request message for transmission to said hub station, said link request message designating which remote station is the destination station.

66. A satellite communication system according to claim 55, wherein said hub station includes a network management facility computer and an associated network configuration database, and wherein said network management facility computer is operative to examine a network configuration database, to determine availability of idle carrier frequencies, and of a tunable modulator—demodulator pair in each of said originating and destination stations.

67. A satellite communication system according to claim 66, wherein said originating and destination remote stations are operative to maintain their tunable modulator—demodulator pairs tuned to their assigned frequencies as long as any voice calls are present.

68. A satellite communication system according to claim 67, wherein each of said originating and destination remote stations, in response to termination of call traffic therebetween, is operative to forward a message to said hub station, indicating that all traffic between the linked stations has been completed, and wherein said hub station's network management facility computer is operative to update its network configuration database, so as to allow said tunable modulator—demodulator pair in said originating and destination stations to be tuned to carrier frequency pairs associated with other remote stations.

* * * * *